US005131343A

United States Patent [19]

Oike

[11] Patent Number: 5,131,343

[45] Date of Patent: Jul. 21, 1992

[54] INTEGRATING METER

[75] Inventor: Yukio Oike, Shizuoka, Japan

[73] Assignee: Yazaki Corporation, Tokyo, Japan

[21] Appl. No.: 672,294

[22] Filed: Mar. 20, 1991

[30] Foreign Application Priority Data

Mar. 22, 1990 [JP] Japan .............................. 2-28194[U]

[51] Int. Cl.[5] ......................... G01C 22/00; F16F 1/34

[52] U.S. Cl. .................................... 116/62.1; 235/97; 235/95 R; 267/158; 267/161

[58] Field of Search .................... 116/62.1, 62.2, 62.3, 116/62.4, 284, 299; 267/158, 161; 235/95 R, 95 A, 95 B, 95 C, 96, 97

[56] References Cited

U.S. PATENT DOCUMENTS

| | | | |
|---|---|---|---|
| 2,062,461 | 12/1936 | Le Fevre | 116/62.1 |
| 2,690,529 | 9/1954 | Lindblad | 267/161 |
| 2,775,406 | 12/1956 | Rodanet | 235/97 |
| 3,097,792 | 7/1963 | Harada | 235/97 |
| 3,333,768 | 8/1967 | Powell | 235/97 |

*Primary Examiner*—Thomas B. Will
*Assistant Examiner*—W. Morris Worth
*Attorney, Agent, or Firm*—Armstrong & Kubovcik

[57] ABSTRACT

An integrating meter comprising a rotatable masking ring integrally containing elastic members for applying a predetermined thrust pressure to a plurality of less to more significant digit number rings rotatably aligned on a support shaft, the masking ring being positioned to the left of the most significant digit number ring. This construction eliminates the need for a conventional coil spring for pushing the number rings in the thrust direction. With the number of its parts reduced, the integrating meter is easy and inexpensive to manufacture.

2 Claims, 2 Drawing Sheets

INTEGRATING METER

BACKGROUND OF THE INVENTION

1. Field of the Invention

The present invention relates to an integrating meter and, more particularly, to an integrating meter installed in vehicles and adapted to totalize the distance traveled thereby.

2. Description of the Prior Art

One representative type of conventional integrating meter comprises an enclosure containing a shaft that supports thereon a plurality of rotatable number rings arranged side by side. The number rings re equipped with pinion gears therebetween. The pinion gears are driven to produce shifts from less to more significant digits of the rings so that the rings when aligned indicate the result of integrating operations.

FIG. 3 is a top view of one such prior art integrating meter for use on vehicles. In the rear of a dial 1 that provides the front of the meter enclosure is a frame 3 mounted on a chassis 2. Attached to the frame 3 is a support shaft 4 that has a plurality of rotatable number rings 5 mounted thereon and arranged side by side. To the right of the least significant digit number ring 5 is a transmission gear 8, a driving gear 6 and a reduction gear 7, the latter two gears being rotated by a predetermined driving force. The driving force transmitted to the least significant digit number ring 5 via the transmission gear 8 is in turn conveyed to more significant digit number rings via pinion gears, not shown, to provide necessary shifts in numeral data represented by the rings.

To the left of the most significant digit number ring 5 is a blank rotatable ring 9 for masking purposes. Between the ring 9 and the frame 3 are the number rings 5 aligned within a display window 10 formed on the dial 1. A coil spring 11 is provided to push the rings 5 in the thrust direction. This construction is intended to ensure some room for movement of the rings in the thrust direction.

In the integrating meter of the above-described construction, the coil spring 11 ensures an easy-to-view numeric display by definitely aligning the number rings 5 within the window 10 of the dial 1. The rotatable ring 9 to the left of the most significant digit number ring 5 prevents any gap from developing between the side of that ring and the edge of the display window 10. Installed where it is, the ring 9 shields the view of the internal mechanisms of the integrating meter from outside and keeps the internal lighting for nighttime illumination from leaking out of the enclosure.

One disadvantage of the above conventional integrating meter is the need to mount the coil spring 11 on the support shaft 4 so as to push the number rings 5 and the rotatable ring 9 in the thrust direction, all the rings being rotatably supported by the shaft. Being a discrete part, the coil spring 11 increases the total number of meter parts and requires another process in which to mount it onto the support shaft 4. As a result of this, production cost is increased with the prior art.

SUMMARY OF THE INVENTION

It is therefore an object of the present invention to provide an integrating meter which has fewer parts to incorporate and is easier and less expensive to manufacture than its prior art counterpart.

In carrying out the invention and according to one aspect thereof, there is provided an integrating meter housed in an enclosure containing a support shaft on which a plurality of number rings are rotatably mounted and arranged side by side, the rings representing the least to most significant digit number data for display, the most significant digit number ring having a rotatable ring for masking purposes positioned to the left thereof, the enclosure containing a display window thereon at the front, the display window allowing the number rings to be observed therethrough, the number rings being subject to a predetermined thrust urge so as to be aligned meaningfully within the display window, wherein the rotatable masking ring integrally comprises elastic means for applying the required thrust urge to the number rings.

As described, the rotatable masking ring integrally comprises the elastic means for applying the necessary thrust urge to the multiple less to more significant number rings, the masking ring being positioned to the left of the most significant digit number ring. This arrangement eliminates the need for the conventional coil spring for urging the number rings in the thrust direction. With the number of its parts reduced, the integrating meter according to the invention is easier and less expensive to manufacture than the comparable type of prior art integrating meters.

DESCRIPTION OF THE PREFERRED EMBODIMENT

Figure 1:
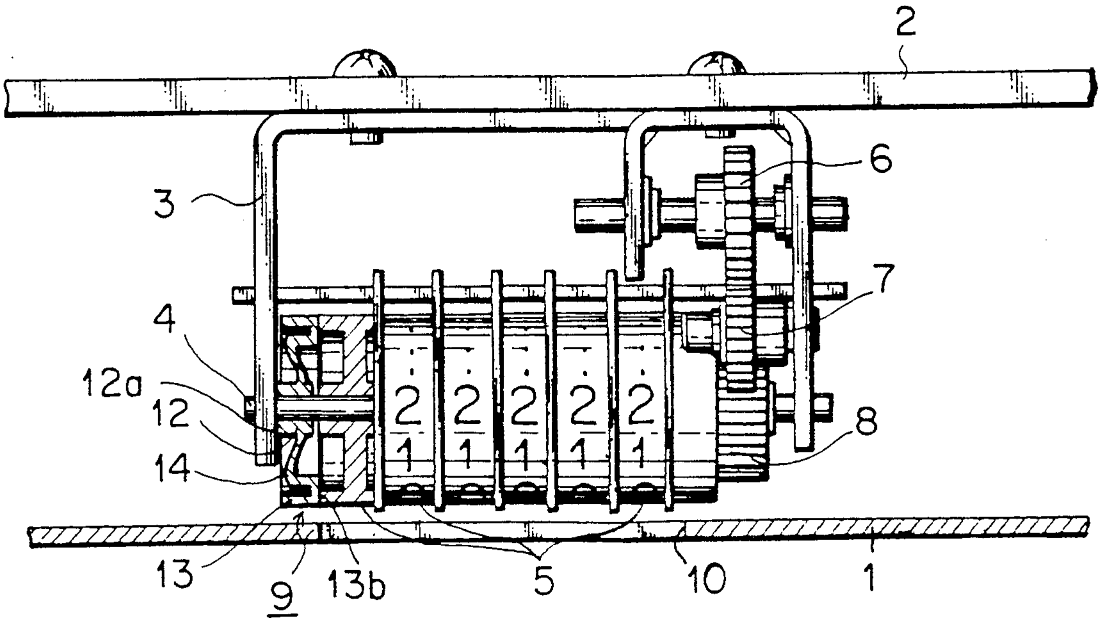
FIG. 1 is a top view of an integrating meter embodying the present invention.

One preferred embodiment of the present invention will now be described with reference to FIGS. 1 and 2. Of the parts in FIGS. 1 and 2, those also shown in FIG. 3 illustrating the typical prior art integrating meter are designated by like reference numerals.

Figure 2:
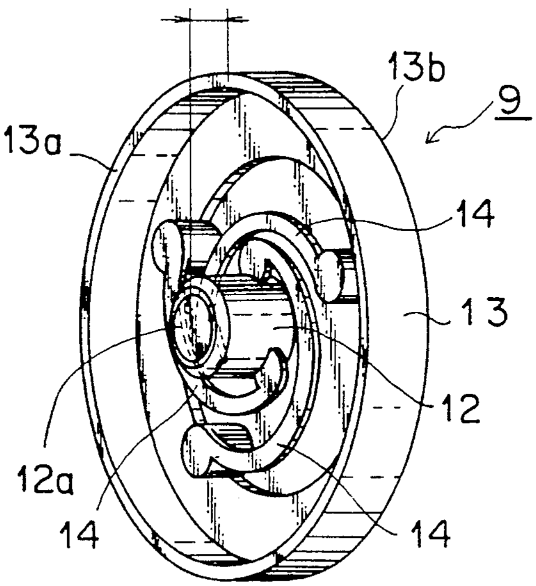
FIG. 2 is a perspective view of a rotatable ring for masking purposes for use with the embodiment.
Figure 3:
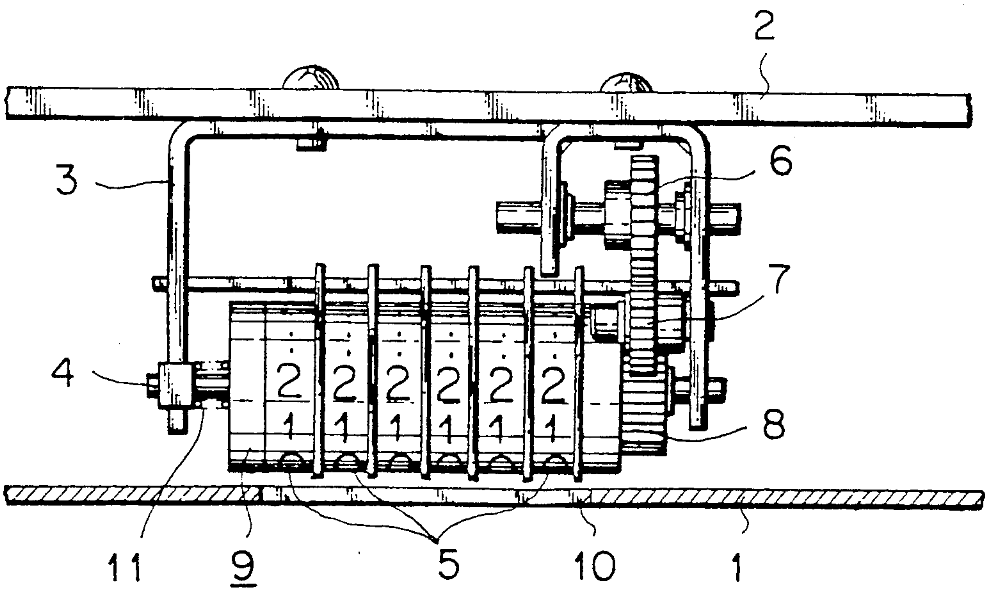
FIG. 3 PRIOR ART
FIG. 3 is a top view of the typical prior art integrating meter.

In the embodiment depicted in FIGS. 1 and 2, a dial 1 is positioned at the front of the enclosure. In the rear of the dial 1 is a frame 3 mounted on a chassis 2. Attached to the frame 3 is a support shaft 4 on which a plurality of number rings 5 are rotatably mounted and arranged side by side. To the right of the least significant digit number ring 5 is a driving gear 6 and transmission gear 8 engaged with a reduction gear 7, the latter two gears being rotated by a predetermined driving force. The driving force transmitted to the least significant digit number ring 5 via the transmission gear 8 is in turn conveyed to more significant digit number rings via pinion gears (not shown) between the rings to provide necessary shifts in numeric data represented by the rings.

To the left of the most significant digit number ring 5 and against the frame 3 is a blank rotatable ring 9 for masking purposes. The rotatable ring 9 is idly supported by the support shaft 5, alongside of the number rings 5 mounted on the shaft. The rotatable ring 9 prevents any gap from developing between the side of the most significant digit number ring 5 and the edge of the display window 10. The window 10, formed on the dial 1, permits display of numeric data represented by the rings 5. Installed where it is, the ring 9 shields the view of the internal mechanisms of the integrating meter from outside and keeps the internal lighting for nighttime illumination from leaking out of the enclosure.

As depicted in FIG. 2, the rotatable ring 9 has at its center a shank 12 that idly supports the rotatable ring 9 around the support shaft 4. The shank 12 is connected to a circumference 13 of the ring 9 using a plurality of arc-shaped elastic members 14 installed in a substantially spiral manner. When observed alone, the rotatable ring 9 has one of its ends 12*a* slightly project from one edge 13*a* of the circumference 13. The rotatable ring 9, comprising the shank 12, circumference 13 and multiple arc-shaped elastic members 14, is formed by conventional plastic molding means using such synthetic resins as polyamide, polyacetal, polyphenylene oxide (Noryl) and ABS resin.

When assembled, the rotatable ring 9 is idly supported by the support shaft 4 so that the projected edge 12*a* at the shank 12 of the rotatable ring 9 faces the frame 3, the ring being installed between the most significant digit number ring 9 and the frame 3. With the projected edge 12*a* of the shank 12 abutting against the frame 3, the arc-shaped elastic members 14 are distorted, because one end of the members each is connected to the shank 12 and yields as far back as the edge 13*a*. The elastic force released upon distortion of the elastic members 14 pushes the circumference 13 of the rotatable ring 9 against the most significant digit number ring 5, the rotatable ring 9 being connected to the other end of the elastic members 14 each. This leaves the most significant digit number ring 5 in contact with the other edge 13*b* of the circumference 13 of the rotatable ring 9 facing that ring 5. As a result, the arc-shaped elastic members 14 of the rotatable ring 9 urge in the thrust direction the number rings 5 rotatably supported by the support shaft 4.

As described, this embodiment has the rotatable masking ring 9 equipped with the elastic members 14 for pushing in the thrust direction the number rings 5 rotatably supported and aligned along the support shaft 4, the ring 9 being positioned on the left of the most significant digit number ring. The arrangement eliminates the need for a coil spring conventionally mounted on the support shaft 4. Simply having the rotatable ring 9 idly supported by the support shaft 4 applies pressure to the number rings 5 in the thrust direction, with some room allowed for movement of the rings 5. With the number of its component parts reduced, the integrating meter according to the invention is easy and inexpensive to manufacture. Because the process of mounting the coil spring onto the support shaft 4 is eliminated, the efficiency of assembling the integrating meter according to the invention is enhanced.

The above-described embodiment is not limitative of the present invention. Many apparently different embodiments of the invention may be made without departing from the spirit and scope thereof except as defined in the appended claims. For example, the elastic members 14 of the rotatable ring 9 may vary in shape and/or quantity as long as they provide the required thrust load.

What is claimed is:

1. An integrating meter for progressively integrating units of measurement comprising:

an enclosure having a display window therein;

a support shaft and means for mounting said support shaft provided therein;

a plurality of number rings rotatably mounted on said support shaft side by side, said plurality of number rings including least to most significant digit number rings to display numerical data for observation through said window of said enclosure;

means for progressively rotating said number rings from the least to most significant number rings to indicate the total units measured;

a rotatable blank ring mounted on said support shaft between the most significant digit number ring and said means for mounting said support shaft; and urging means integrally formed within said rotatable blank ring for elastically applying a thrust pressure to said plurality of number rings.

2. An integrating meter for progressively integrating units of measurement according to claim 1, wherein said urging means includes a shank positioned within said rotatable blank ring and a plurality of arc-shaped elastic members disposed in a spiral manner to connect said shank and said rotatable blank ring, said shank normally projecting from one end of said rotatable blank ring in an axial direction and abutting against said means for mounting said support shaft to yield as far back as said one end of said rotatable blank ring.

* * * * *